United States Patent
Lindbo

(10) Patent No.: US 9,845,208 B2
(45) Date of Patent: Dec. 19, 2017

(54) SYSTEM OR METHOD FOR STACKING CONTAINERS

(71) Applicant: OCADO INNOVATION LIMITED, Hatfield, Hertfordshire (GB)

(72) Inventor: Lars Sverker Ture Lindbo, Hatfield (GB)

(73) Assignee: OCADO INNOVATION LIMITED, Hatfield, Hertfordshire (GB)

( * ) Notice: Subject to any disclaimer, the term of this patent is extended or adjusted under 35 U.S.C. 154(b) by 0 days.

(21) Appl. No.: 14/896,606

(22) PCT Filed: Jun. 5, 2014

(86) PCT No.: PCT/IB2014/061989
§ 371 (c)(1),
(2) Date: Dec. 7, 2015

(87) PCT Pub. No.: WO2014/195901
PCT Pub. Date: Dec. 11, 2014

(65) Prior Publication Data
US 2016/0145058 A1 May 26, 2016

(30) Foreign Application Priority Data
Jun. 6, 2013 (GB) .................................. 1310125.8

(51) Int. Cl.
*B65G 57/30* (2006.01)
*B65G 1/04* (2006.01)
(Continued)

(52) U.S. Cl.
CPC ......... *B65G 57/303* (2013.01); *B65G 1/0457* (2013.01); *B65G 1/0464* (2013.01);
(Continued)

(58) Field of Classification Search
CPC ... B65G 1/0457; B65G 1/0464; B65G 57/303
See application file for complete search history.

(56) References Cited

U.S. PATENT DOCUMENTS 2,701,065 A * 2/1955 Bertel .................. B65G 1/0464
212/327
4,715,762 A * 12/1987 Lanigan, Sr. ......... B66C 19/007
212/324
(Continued)

FOREIGN PATENT DOCUMENTS

DE 19803143 A1 * 1/1998 ............... B65G 1/04
DE 20 2006 002 326 U1 4/2006
(Continued)

OTHER PUBLICATIONS

International Search Report (PCT/ISA/210) dated Sep. 29, 2014, by the European Patent Office as the International Searching Authority for International Application No. PCT/IB2014/061989.
(Continued)

*Primary Examiner* — Thomas Randazzo
(74) *Attorney, Agent, or Firm* — Buchanan Ingersoll & Rooney PC

(57) ABSTRACT

Systems, methods, and machine-executable coded instruction sets are disclosed for fully- and/or partly automated handling of goods. For example, the disclosure provides improvements in storage and retrieval of containers in systems such as order processing systems.

20 Claims, 14 Drawing Sheets

(51) Int. Cl.
*B65G 61/00* (2006.01)
*B65G 57/03* (2006.01)
*B65G 59/02* (2006.01)
*B65G 59/06* (2006.01)
*G05B 15/02* (2006.01)

(52) U.S. Cl.
CPC .......... *B65G 57/03* (2013.01); *B65G 57/302* (2013.01); *B65G 59/02* (2013.01); *B65G 59/063* (2013.01); *B65G 61/00* (2013.01); *G05B 15/02* (2013.01)

(56) References Cited

U.S. PATENT DOCUMENTS

| | | | | |
|---|---|---|---|---|
| 4,865,515 | A * | 9/1989 | Dorner | B65G 57/302 221/297 |
| 5,794,416 | A * | 8/1998 | Rahman | B65G 67/20 53/157 |
| 6,654,662 | B1 * | 11/2003 | Hognaland | B65G 1/0464 700/214 |
| 8,864,437 | B1 * | 10/2014 | Flaming | B31B 3/00 414/788.2 |
| 2006/0056951 | A1 * | 3/2006 | Williamson | B66F 9/07 414/626 |
| 2015/0127143 | A1 * | 5/2015 | Lindbo | B65G 1/0464 700/218 |

FOREIGN PATENT DOCUMENTS

| | | | |
|---|---|---|---|
| EP | 0 042 236 A1 | 12/1981 | |
| EP | 0794139 A2 * | 1/1997 | .......... B65G 57/303 |
| EP | 0 767 113 A | 4/1997 | |
| EP | 0794139 A2 * | 10/1997 | .......... B65G 57/303 |
| EP | 1 775 241 A1 | 4/2007 | |
| EP | 1 775 242 A1 | 4/2007 | |
| JP | 05-201544 A | 8/1993 | |
| JP | 2005335916 A * | 5/2004 | .......... B65G 1/0464 |
| NO | 317366 B1 | 10/2004 | |
| WO | WO 98/49075 A1 | 11/1998 | |

OTHER PUBLICATIONS

Written Opinion (PCT/ISA/237) dated Sep. 29, 2014, by the European Patent Office as the International Searching Authority for International Application No. PCT/IB2014/061989.

* cited by examiner

SYSTEM OR METHOD FOR STACKING CONTAINERS

The invention relates to a system or method for stacking containers. More particularly but not exclusively it relates to systems and methods for handling containers processed by at least partially-automated storage and retrieval systems. Furthermore, the disclosure provides improved systems and methods for the stacking of containers in fully or semi-automated storage and retrieval systems.

This application claims priority to UK Patent Application No. 1310125.8 filed on Jun. 6, 2013, the entirety of which is hereby incorporated by reference.

Various forms of both fully- and semi-automated order processing and fulfillment systems are known. They, and the components they comprise, may take many forms. As one example, U.S. Pat. No. 2,701,065, describes handling and storing of goods stored in containers stacked in freestanding rows. Another example is shown in EP 0767113 (Cimcorp™), where a mechanism for removing a plurality of stacked bins using a robotic load handler in the form of a rectangular tube which is lowered around bins and is able to grip a in at any level is described.

A frame-structured system is described in WO 98/049075A wherein multiple bins are stacked by virtue of being retained in a grid frame structure. Bins are handled by a moveable load handler, as described in Norwegian patent NO 317366, which is able to pick up the top bin from a stack guided by rails in a large grid. In some implementations, multiple load handlers may be used to increase capacity and reduce access times.

There is need, however, for improvement in the efficiency of systems and processes for storing and retrieving containers in such systems.

Fully- and semi-automatic goods storage and retrieval systems, various aspects of which may sometimes be referred to as "order fulfillment," "storage and retrieval," and/or "order picking" systems, can be implemented in a wide variety of types and forms. One manner of providing access to goods stored for fully- and/or semi-automatic retrieval, for example, comprises placement of goods, which may be of any desired type(s), in bins or other containers (hereinafter referred to generically as containers), and stacking and/or otherwise disposing the containers vertically in layers, and optionally in multiple columns and/or rows, such that individual containers may be accessible by wholly or partially-automated container retrieval systems. Such systems can for example comprise various combinations of containers; container stack support mechanisms, which may include mechanical devices such as frames and/or free-standing, stackable, and/or otherwise specialized container(s); and automated or semi-automated (i.e., "robotic") retrieval devices, such as load handlers which may for example operate on grids or other forms of rails, using wheels, and/or on other forms of mechanical traveling devices.

For example, as shown in FIG. 2, goods storage and retrieval systems may be provided in forms comprising rows and columns of stacked containers, in combination with overhead rail-operated load handlers configured to access the containers for both storage and removal, from above, as shown in FIGS. 3 and 4.

Automatic or semi-automatic order picking systems can include many processes which in some examples may be broadly separated into at least two main aspects. One aspect involves the moving of containers with product into and out of storage with a mechanized or other system. Another aspect involves the transfer of product into, out of and between containers, which may often involve a manual and/or automated process(es).

Optimising container moving processes can, in some examples, involve managing conveyors, cranes, shuttles, robotic load handlers etc in a way which optimizes the throughput of the storage and retrieval system. In a real industrial application, this may involve trade-offs between utilization and performance of different parts of the system, especially as contention for various resources occur over time.

Optimising product moving processes (such as order picking and container replenishment) can, in some examples, focus on keeping the manual (e.g. human) and (semi-)automated pickers/mechanisms constantly engaged without waiting periods. In a general merchandise or grocery picking operation, there may be variations in the time required to perform these tasks, depending on size, weight, shape, robustness etc. of the individual products. For example, during container replenishment, it may take 20 times longer to fill a container with one product than with another product.

Providing a buffer between the container moving mechanical system and the product moving systems may, in some embodiments, reduce or eliminate the delays caused by waiting for a container, a device (such as a load handler, conveyor, etc.) or another resource from the other system to become available. In some examples, this may enable separate or overall optimization of the two systems.

In some example embodiments, the use of buffer may improve labour utilization. In some example scenarios, the productivity of a container replenishment (inbound) process may increase by 30-40%, and the order picking productivity may increase by 20-30% by the introduction of adequately sized buffers. In some examples, the present disclosure provides methods and systems for arranging such buffers in a cost and space efficient manner.

The productivity of the robotic load handlers in some example systems may also be increased by reducing the vertical movement of the load handlers at replenishment and order picking stations. In some scenarios, this may allow more frequent access for the robotic load handlers to each dropoff and pickup location, which may enables a higher pick rate and/or higher labour productivity. Some embodiments of the present disclosure may significantly reduce vertical movement for the load handler.

In some example scenarios and/or embodiments, the efficiency of the described systems, and other types of storage and retrieval systems, may be improved by providing for the storage and access of containers, in stacks, from above and below, as shown for example in FIGS. 5-7, etc.

Thus in various aspects the disclosure herein provides systems, methods, and corresponding machine-executable coded instruction sets for the fully- and semi-automated handling of containers. In particular, the disclosure provides improvements in the stacking of containers in storage and retrieval systems which may be parts of larger systems, such as order fulfillment systems.

In the same and other aspects, the disclosure provides systems for stacking containers in automated storage and retrieval systems. Such system(s) can include one or more clamps, each clamp corresponding to or otherwise defining a stack location and configured for clamping one or more lowest containers in a stack; one or more lifters configured for lifting one or more containers into position suitable for engagement by the clamp(s); and at least one overhead load handler configured for lifting one or more containers from a top of the stack, and for lowering one or more containers onto the top of the stack.

Aspect(s) of the invention can also include lifters comprising mechanisms for lowering one or more clamps to engage one or more containers disposed beneath a stack, and for lifting such clamped container(s) to form a bottom of the stack.

In the same or other embodiments, systems in accordance with the invention can include a conveyors for conveying containers to or from positions beneath stack locations where they can be lifted by such lifters.

In various embodiments, systems in accordance with the invention can include clamps which are moveable along the heights of stacks and configured to clamp and lift any desired containers within the stacks.

In various embodiments, the invention may be implemented using either freestanding stacks or stacks supported by frames, or both.

In further aspects, the disclosure provides corresponding methods, and logic structures such as coded, machine-executable instruction sets suitable for use in implementing such methods and/or otherwise controlling such systems.

Control of such fully and/or semi-automatic systems, and particularly of such clamps, lifters, overhead load handlers, and mechanisms can be accomplished through the use of various forms and combinations of suitably configured sensors, controller mechanism(s), and processor(s) operating according to programmed control logic in the form or software, firmware, etc.

In some aspects, the disclosure provides a system for stacking containers in an automated storage and retrieval system. The system includes: one or more clamps, each clamp defining a stack location and configured for clamping a lowest container in a stack, the one or more clamps configured to support the weight of a plurality of containers in the stack; a lifter configured for enabling engagement by one of the clamps of a container which is disposed beneath the stack, wherein engagement and disengagement of the clamps enables containers to be added to or removed from a bottom of the stack; and at least one overhead load handler configured for lifting one or more containers from a top of the stack, and for lowering one or more containers onto the top of the stack.

In the same or other embodiments, systems in accordance with the invention can include at least one processor configured to manage movement of containers in the system wherein managing the movement of the containers in the system comprises: generating signals for controlling or instructing the one or more clamps, the lifter, and the at least one overhead load handler.

In some aspects, the disclosure provides a method for stacking containers in an automated storage and retrieval system. The method includes: generating, by at least one controller, signals for coordinating operation of a lifter and at least one clamp to add incoming containers to a bottom of a stack, the at least one clamp configured for clamping a lowest container in the stack; and generating, by the at least one controller, signals for controlling or instructing at least one overhead load handler to lift one or more containers from a top of the stack.

The invention is illustrated in the figures of the accompanying drawings, which are meant to be exemplary and not limiting, and in which like references are intended to refer to like or corresponding parts.

Preferred embodiments of methods, systems, and apparatus suitable for use in implementing the invention are described through reference to the drawings.

Figure 1:
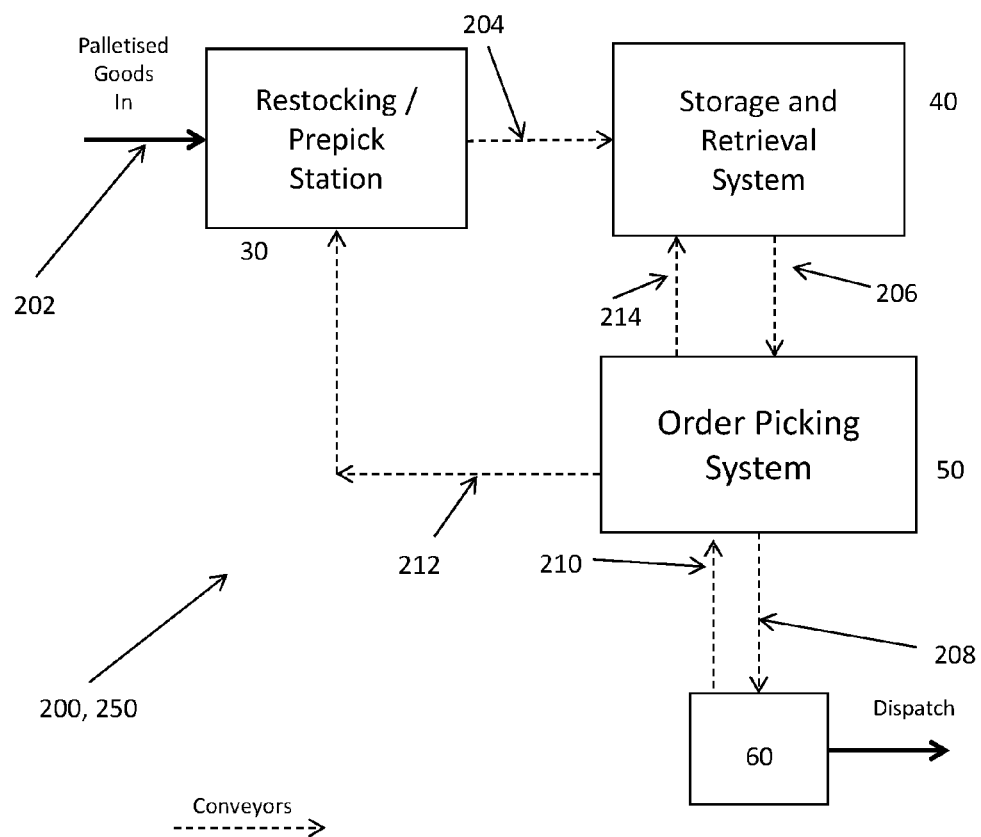
FIG. 1 is a schematic flow diagram illustrating processes and systems to which aspects of the invention can be applied.

One of the most significant applications of storage and retrieval systems in accordance with the invention is in the fully or semi-automated processing of orders, as for example through their use as components 40 of automated order fulfillment systems such as that shown in FIG. 1.

In the embodiment shown in FIG. 1, an order fulfillment system 250 comprises restocking system 30; storage and retrieval system 40, which can include bottom-access storage and retrieval system(s) as described herein; an order picking system 50; and a dispatch facility 60. As will be understood by those skilled in the relevant arts, various components of such a system 250 can be configured in a wide variety of ways, using many different types of devices and processes, in various combinations. Moreover, such systems and processes may be used for the sorting, storage, and delivery of any type(s) of commodities, including for example groceries and/or other office, household and consumer items.

It is also to be understood that while various aspects of the process(es) and system(s) shown in FIG. 1 are illustrated using separate functional or schematic boxes, in various embodiments, physical, logical, and other aspects of the system(s) 250 and function(s) 200 depicted can be combined or otherwise shared in a wide variety of forms.

Restocking station(s) 30 and associated process(es), can for example provide any aspect(s) of order processing system(s) 250 that enable pallets and/or other multi-packs of inbound items to be separated and placed, individually or in groups, into separate containers for storage in a grid-based or other type of storage and retrieval system(s) 40. Such processes can be performed using any suitably-configured fully or semi-automated system(s), using for example various type(s) of conveyors, trolleys, robotic devices, etc., and/or can be performed manually by human workers. In various embodiments, a restocking station 30 can include single or plural pick stations wherein one or more palletized or otherwise grouped item sets are picked and placed into initially empty or partly filled containers.

Storage and retrieval (sub)system(s) 40 can include any machine(s), device(s), infrastructure or arrangement(s) suitable for automatically and/or manually storing and retrieving containers containing one or more items in accordance with the disclosure herein. Preferably, such systems provide means for storing such containers in grids comprising multiple stacks, and for storing, retrieving, and/or otherwise accessing containers stored in such stacks from both the top and the bottom, as disclosed herein.

Order picking station(s) 50 can include any types or forms of system(s) suitable for receiving containers of items retrieved by storage and retrieval system(s) 40, and enabling picking of items therefrom. Such system(s) can, for example, include various types and form of conveyor or trolley-based systems, wherein containers 1 can be loaded on conveyor(s) or picking trolley(s) for transport to picking areas, for automated and/or manual removal of items and to be placed in delivery or other order-assembly containers.

Aspects of storage and retrieval system(s) 30, 40, 50 in accordance with the invention can be implemented using components provided by manufacturers such as Autostore™, Cimcorp™, and others.

An example of operation of a system 250 can be described through reference to FIGS. 1 and 4-7. At 202, palletized or other batches of items arrive at a restocking station 30. For example, pallet(s) items may be removed from a truck or other means of conveyance at an order processing/fulfillment center, and be wheeled into one or more restocking station(s) 30 comprising tables, conveyors, trolleys, etc. for holding a plurality of bins or containers 1. Upon removal or opening of any packaging, at station 30, one or more product(s) may be into bins 1 or other containers.

As desired stocking of containers 1 is completed, at 204 the containers may be transferred for storage in a storage and retrieval system 40 (FIGS. 4 and 5), as for example by conveyor, and stored therein until needed for fulfillment of an order. For example, a container 1 may be brought to a grid 2, engaged by an overhead load handler 4 at a port 7 or a bottom-access lifter/clamp, and stored within a stack 3 of the grid until needed for further order fulfillment processes.

When it is subsequently determined that a container 1 containing one or more items is needed for further order fulfillment processes, at 206 that container 1 may be retrieved from the storage and retrieval system 40 and delivered to an order picking station 50. For example, a container 1 identified as needed, or otherwise desired, for fulfilling an order may be retrieved from a storage point 18 (see e.g. FIG. 4) in the grid 2 by a load handler 4 or lifter 71, and transported to a delivery port 7. At the port 7, the container 1 can be lowered to or otherwise placed on a conveyor 5 or other conveyance for delivery to a an order picking station 50.

At the order picking station 50, items may be removed from retrieved container(s) 1, placed into order or delivery container(s), and otherwise readied for delivery as necessary.

At 208, packed containers 1, or sets thereof comprising parts or entireties of picked orders may be transported, via conveyor, forklift, or other means, to a vehicle loading or other delivery point 60, for dispatch to any ordering customer(s). For example, in a system 250 comprising a picking station , container(s) 1 that have been filled with all desired items may be moved by the picker onto a conveyor or other device, for delivery to a dispatch facility 60 or other desired location.

At dispatch facility 60, packed containers 1 associated with one or more assembled orders may be sorted and delivered to transport means, such as trucks, or otherwise delivered to, or made ready for delivery to, customer(s) or other agents associated with the order(s). It should be understood that providing a container for dispatch can include queuing or otherwise identifying the container as being ready for shipment, and does not necessarily include the actual loading or shipment of the container.

At 210, 212, 214, wholly and/or partially emptied containers 1 can be returned to desired point(s) in the order fulfillment system 250, for further storage and/or restocking as desired.

Principles of the invention may be applied with particular advantage to the semi- and/or fully-automated acceptance and fulfillment of orders. Such orders can, for example, include orders entered via the Internet and/or other public and private communications networks.

As noted above, in a typical commodities picking operation adapted for handling a large variety of items, such as a grocery order processing system, storage and retrieval systems 40 may be implemented to handle wide ranges and quantities of items. In some embodiments, such items can be placed in bins or other containers, and organized in grids of stacked or layered containers to reduce the space required to store all the containers. In various embodiments, such grids can comprise freestanding stacks, and/or stacks supported by frames. For example, in the storage and retrieval system 40 illustrated in FIG. 2, containers 1 can be stored in grid(s) 2 comprising columns 12 and rows 10 of stack(s) 3.

Figure 2:
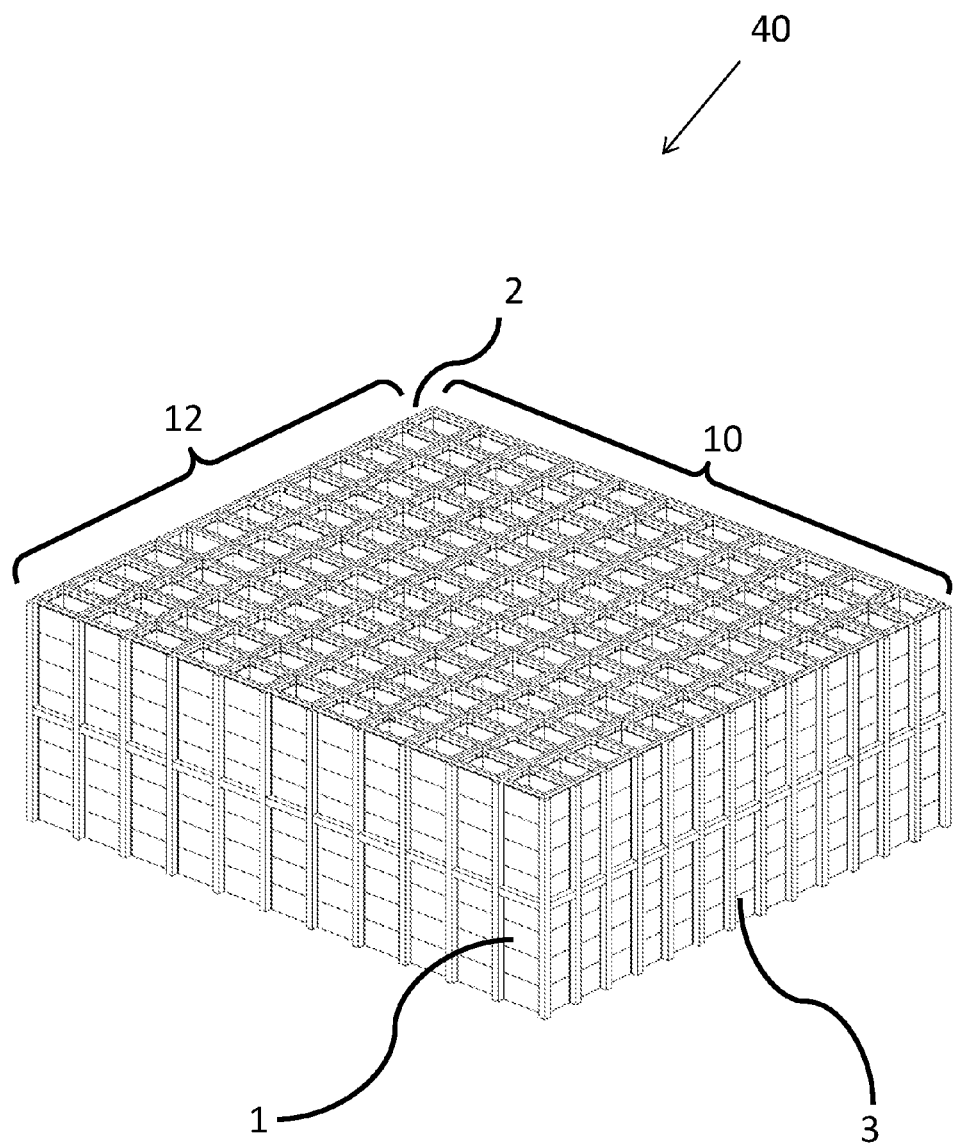
FIGS. 2 and 4-6 are schematic diagrams showing aspects of an embodiment of a storage and retrieval system suitable for use in implementing the invention can be applied.

In various embodiments, grid(s) 2 associated with system(s) 40, 250 of the type shown in FIG. 2 may comprise any desired number(s) of stacks 3 of containers 1, in the form of bin, boxes, baskets, pallets, and/or other containers.

Containers 1 stored in a grid 2 can be stored in and/or retrieved from stacks 3 through the use of various automatic or semi-automatic devices or systems. Devices and systems in accordance with the invention may pull containers from, and/or insert containers into, stacks 3 from any accessible direction(s), including the top, side(s), and bottom of the grid 2.

While some storage and retrieval systems 40 have provided for the accessing of containers 1 from the tops of grids 2 and/or stacks 3, an alternative or additional ability to retrieve containers from, and insert containers to, the bottom of such grids or stacks, as disclosed herein, can provide numerous advantages, including improved efficiency in a number of circumstances.

Figure 3:
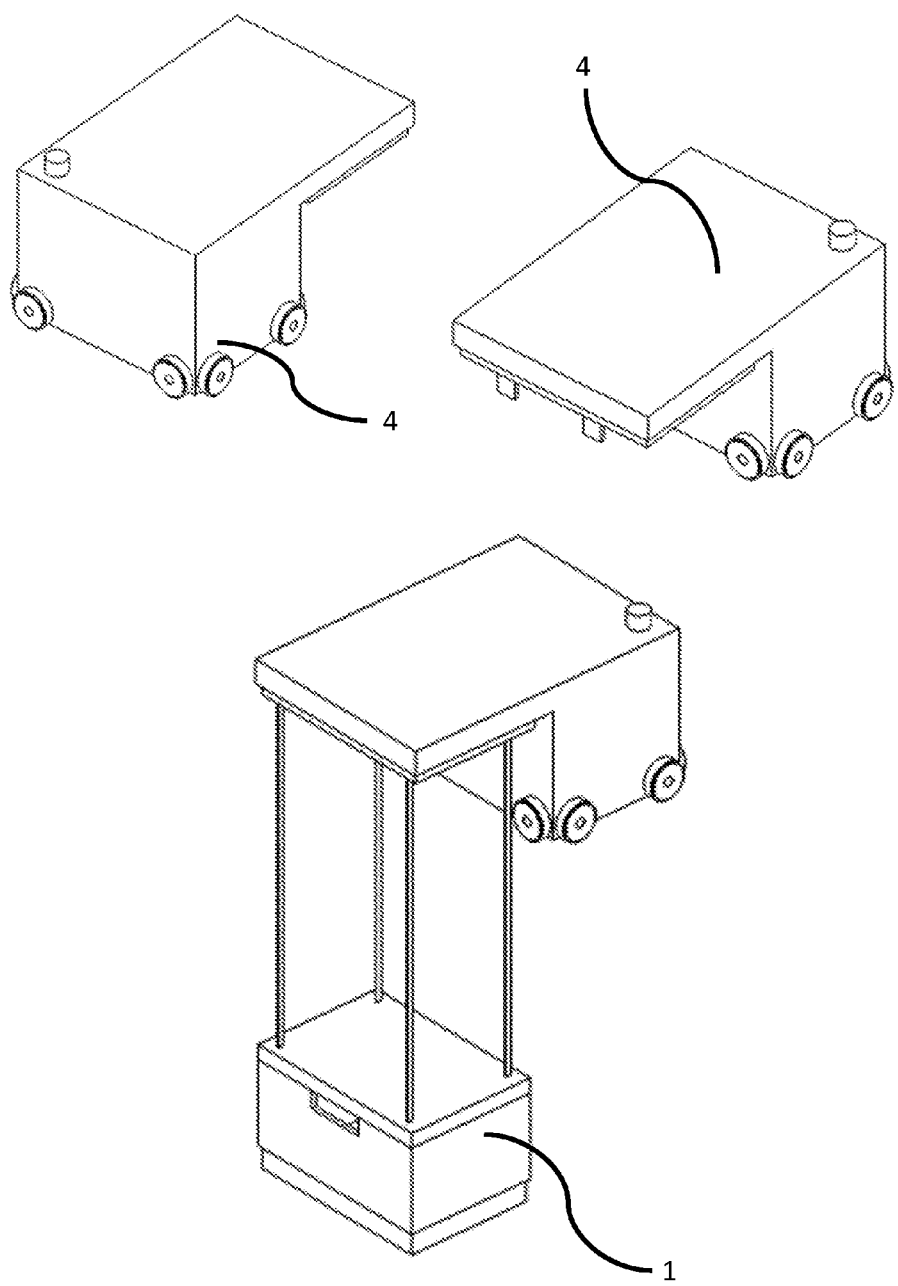
FIG. 3 is a schematic diagram showing devices suitable for use in implementing aspects of the invention.
Figure 4:
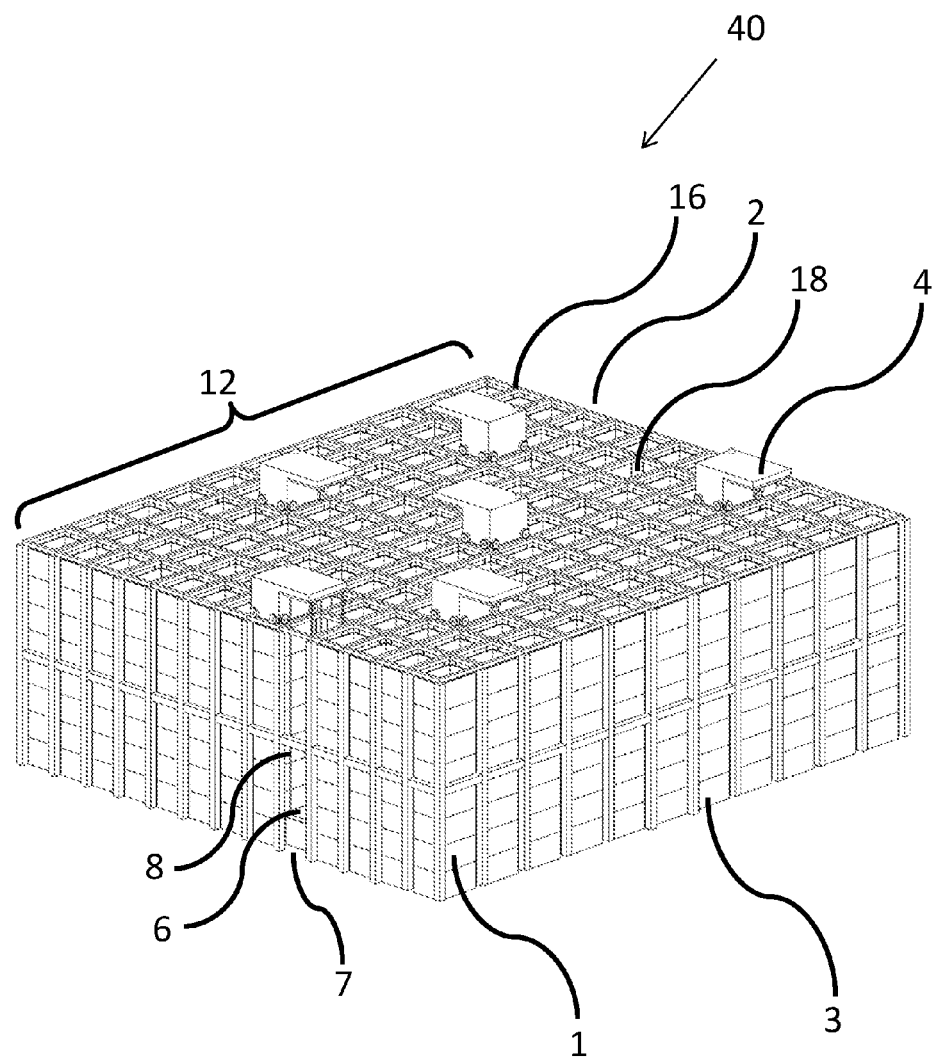

For example, as shown in FIGS. 3 and 4, containers 1 can be stored in and/or retrieved from a storage and retrieval system 40 through the use of overhead load handlers 4 configured to travel above the grid 2, as for example on rails 16, and to engage containers 1 from above. As shown at 7 in FIG. 4, for example, a load handler 4 can use a hoist 8 or other device to lower a gripper 6 to engage and lift the container 1 from the top of the stack 3 in which it is placed.

In some examples, the grid 2 can provide a structural framework for guiding bins as they are stored or retrieved from the system 40, and for preventing stacks from falling over. Rails 16 can be part of the grid 2 structure or may be separate structure(s) positioned above the grid 2. While the example rails 16 in FIG. 4 are illustrated as a perpendicular tracks, the rails 16 may be in any shape or configuration which allow for bots to access each stack location while not impeding the ability to store or retrieve bins from the top of the stacks 3.

The robotic load handlers 4 can be configured to travel along the rails to access the various stacks 3 in the system. As illustrated in FIG. 3, an example robotic load handler can have two sets of perpendicular wheels for engaging the track. In some embodiments, the robotic load handlers may include a lifter or other mechanism which is used to select which set of wheels engage with the track and thereby control the direction of travel along the rails.

In other embodiments, only a single set of turnable wheels or other mechanisms may be used to engage perpendicular or other rail arrangements.

The robotic load handlers can include a gripper or other mechanism which can be lowered from the load handler by way of wires, ropes, tapes or other cable-like mechanisms. Once in contact with the container 1, an anchor or other engagement mechanism on the gripper can securely engage with an upper portion of the container 1. The container 1 may then be lifted off the stack and out of the grid structure by the robotic load handler. The anchor mechanism can take many forms, but in some examples may include a hook or a rotating key.

In order to retrieve containers 1 which are not at the top of a stack, robotic load handlers 4 may be instructed to sequentially remove each container stacked on top of the desired container 1 until the desired container 1 is at the top and can be accessed and removed. Any containers initially stacked on top of the desired container may be moved to other locations in the system or may be temporarily held/stored elsewhere and returned to the same stack once the desired container has been retrieved. In some examples, retrieving a desired container from the middle or bottom of a large stack of containers may take a long time and can occupy one or more robotic load handlers 4 for a significant amount of time.

As system demands increase and additional overhead load handlers 4 are used, traffic congestion and/or other forms of contention can develop between load handlers. For example, when multiple load handlers attempt to access containers or travel in the same region of the grid, one or more load handlers may have to wait until another load handler completes its task or otherwise moves out of the way. This can, in some cases, increase the time required for storage and retrieval of containers, and can slow down any subsequent load handling and/or order-processing activities which cannot be started until the current load handling tasks are completed. Likewise, when a stack 3 comprises a relatively smaller number of containers relative to a maximum stack height of the grid 2, the gripper 6 of the overhead load handler 4 may be required to travel a significant distance to reach the top of the stack, and travel the same distance back again as it is retracted, and to use a relatively larger amount of time in doing so than if the stack 3 comprised more containers 1.

In some example embodiments, these and other inefficiencies may be alleviated, or eliminated altogether, through the use of bottom-access systems as disclosed herein. Further advantages offered by the some embodiments of the invention can include rapid, sure engagement of containers 1 to be inserted into and/or removed from stacks 3 of grid 2.

Figure 4A:
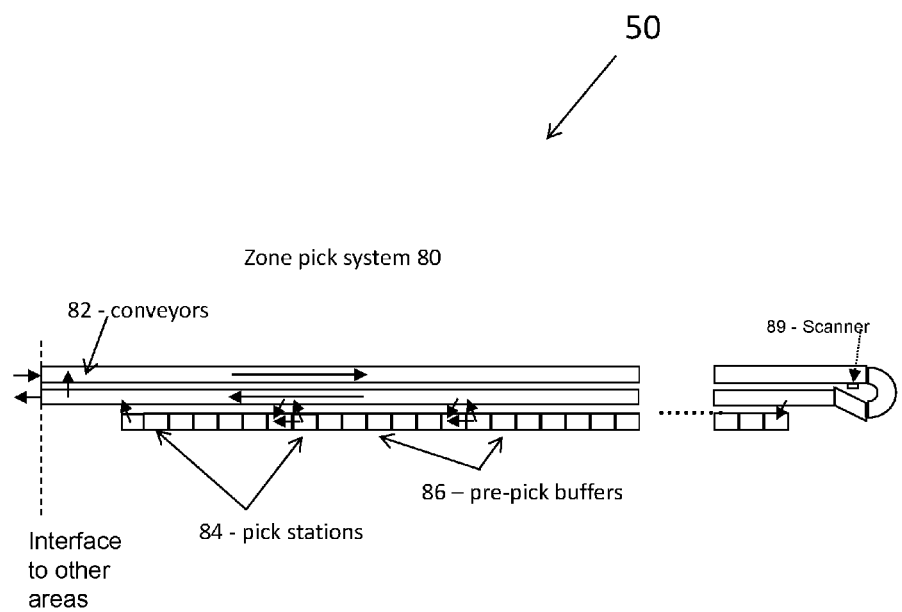
FIG. 4a is a schematic diagram showing aspects of an example picking system.

In some examples, the use of buffering system(s) can improve the de-coupling of manual, and therefore often unpredictable, activities such as restocking and picking from the tasks performed by load handlers/lifters. FIG. 4a illustrates an example of a conventional zone pick system 80, wherein a prepick buffer 86 can be provided between the transport conveyor system 82 and the picker 84. In some operational instances, this buffering can combine high throughputs with high labour productivity. In some examples, aspects of the present application may be utilized to provide similar buffering to a grid based storage and retrieval system as described for example in FIG. 12 or any other example embodiments.

Figure 5:
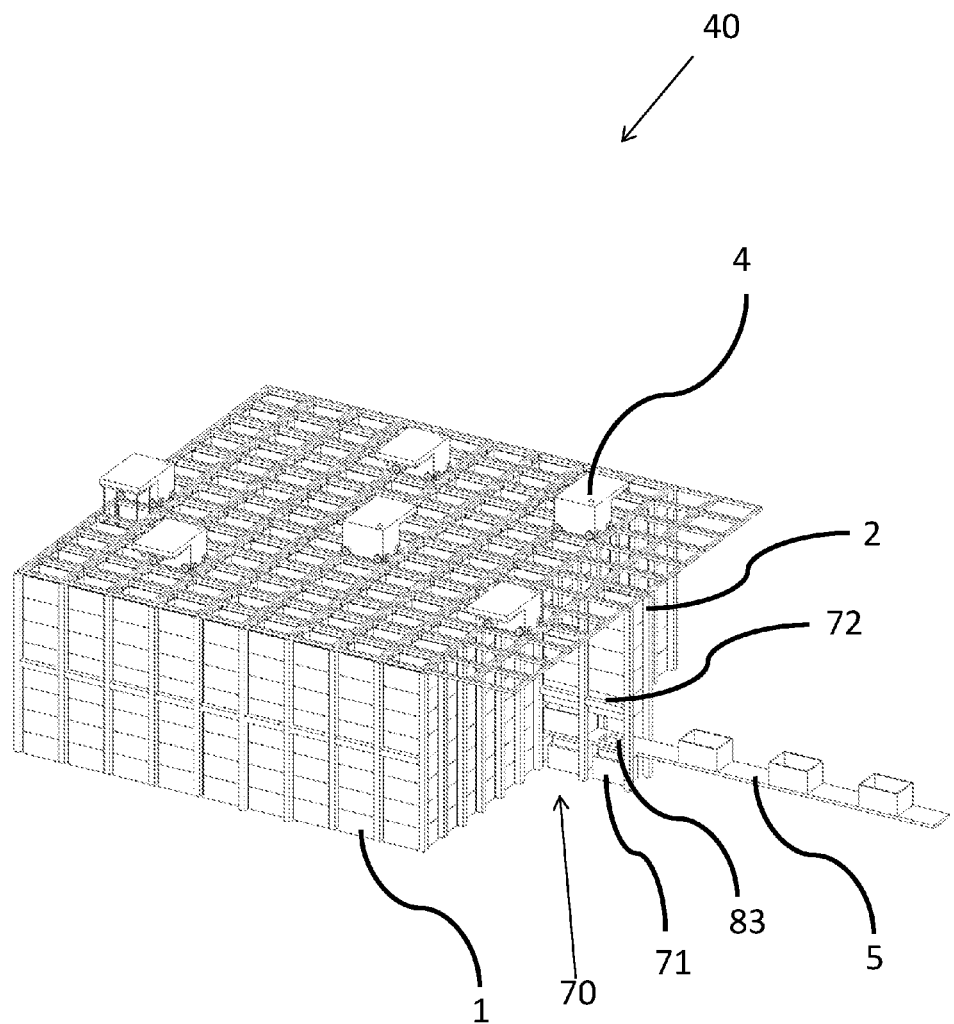

For example, the use of both top-access load handlers 4 and bottom-access clamp-and-lifter handlers as described herein can facilitate the use of buffer regions within grid(s) 2, particularly when coupled with the use of conveyors, etc., as shown for example in FIG. 5.

Examples of systems 40 for handling containers 1 in automated storage and retrieval systems 40 in accordance with the invention are shown in FIGS. 5-11. As shown in FIGS. 5-9, a system 40 can include one or more clamps 72 for clamping or otherwise engaging one or more lowest containers 1 in a stack 3 at any desired or otherwise suitable stack location(s) among row(s) 10 and column(s) 12. Such systems 40 for handling containers can further include one or more lifters 71 for lifting one or more containers 1 in order, for example, to enable engagement of such containers by a clamp or clamps 72 and thus add the container(s) to the bottom of a stack or stacks 3.

Alternatively, or in addition, clamp(s) 72 can be configured to engage one or more containers 1 to enable release of clamp(s) 72, lowering of the corresponding container(s) 1 and/or stack 3, engagement of one or more higher containers in the stack, and removal of the released container(s).

In various embodiments, as may be seen, clamp(s) 72 can define the bottom of corresponding stack(s) 3 by engaging and then continuing to hold bottom-most container(s) 1 and thereby also supporting any additional containers 1 above.

Figure 9:
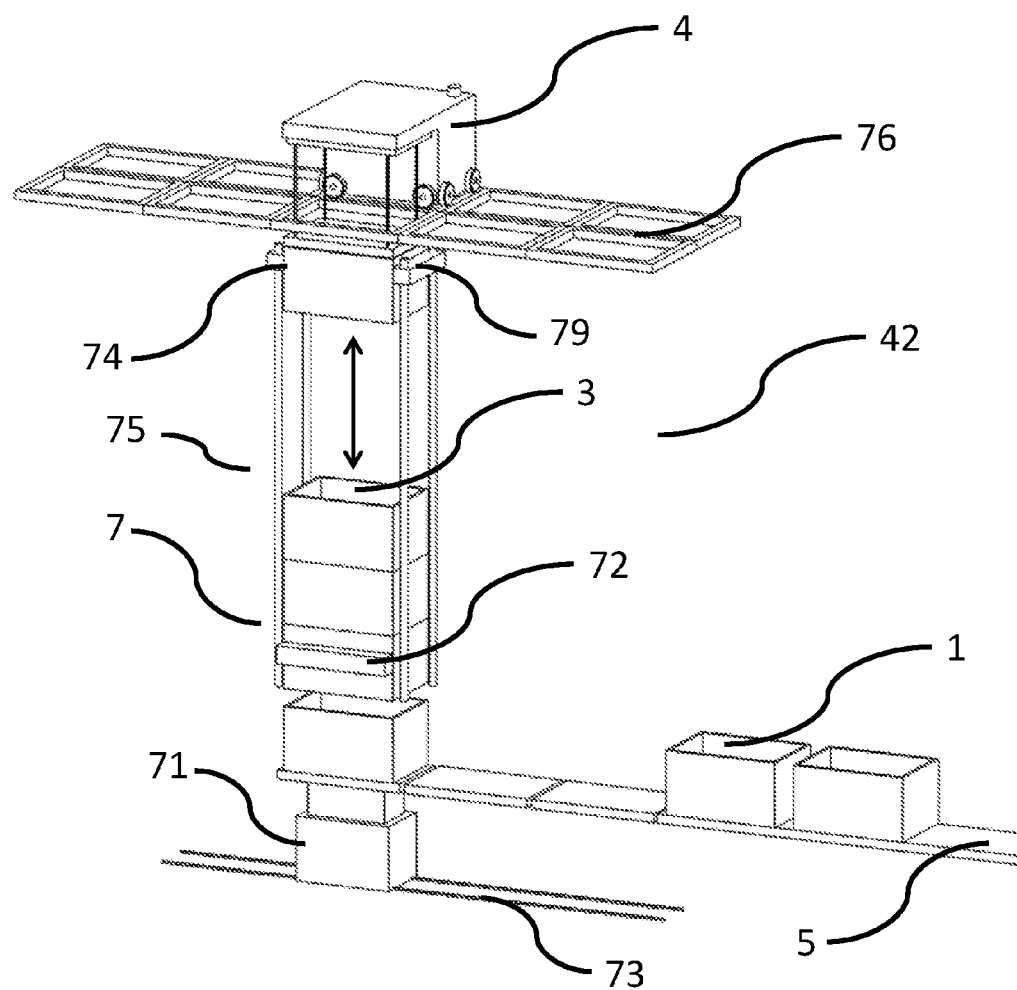

In the same and/or other embodiments, as shown for example in FIG. 9, moveable clamp(s) 79 can be used in conjunction with bin elevator(s) 75 to engage container(s) 1 and move them between lower clamp(s) 72, and/or the top(s) of stack(s) 3, and hand-over position(s) 74 suitable for rapid and efficient engagement by overhead load handler(s) 4. Such apparatus may be used to rapidly receive one or more containers 1 from an overhead handler 4 and lower them onto the top of a stack 3, and/or to remove them from the top of a stack and hand them off, at a hand-over position 74, to such overhead handler(s). Such use of device(s) 72, 75, 79 can significantly reduce wait and/or handling times for load handler(s) 4 and ease congestion at critical points in the system.

Operation of bottom-access storage and retrieval systems in accordance with the invention may be explained through reference to FIGS. 5-11.

Figure 7:
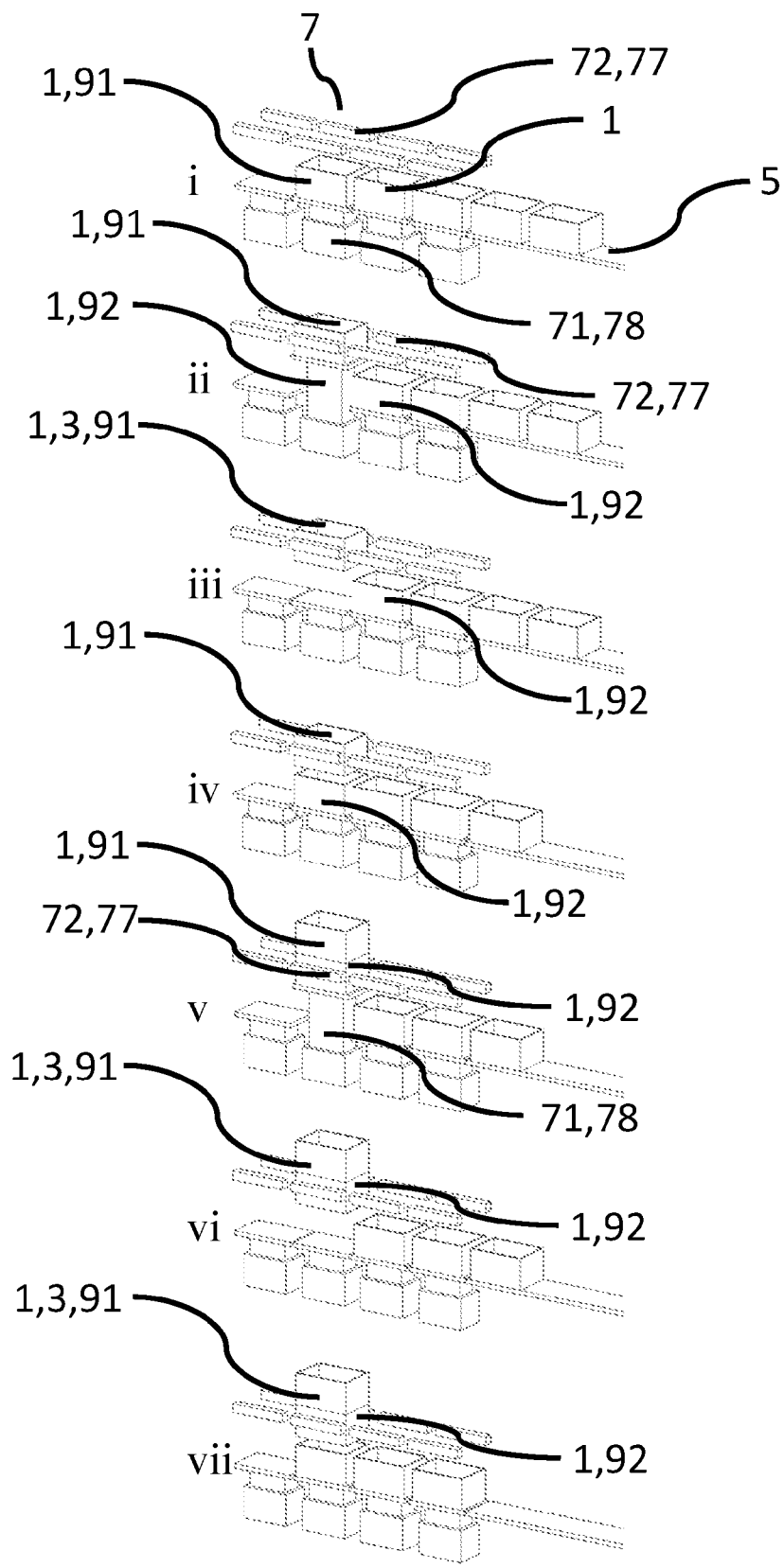
FIG. 7 shows a series of schematic diagrams illustrating aspects of an example process for stacking containers.

For example, FIG. 7 shows a sequence of side views (i-vii) illustrating one example process for stacking containers using apparatus in accordance with the invention. At (i), a series of containers 1 is moved via a conveyor 5 toward a location 7 (from right to left in the figure) in which there exists a stack 3 of containers, or in which there is to be created such a stack. As noted above, one or more stack locations 7 can be defined by the presence of clamp(s) 72, 77 adapted for supporting one or more container(s) 1 and any containers resting thereon. In (i), the left-most container 1, 91 arrives at a position beneath a desired stack location 7 defined by a clamp 72, 77.

At (ii), a lifter 71, 78 beneath the desired stack location 7 lifts or otherwise maneuvers the container 1, 91 into a position in which it can be engaged and retained by the clamp 72, 77 at the stack location 7. With the container 1, 91 at a proper height, and/or otherwise in a suitable position relative the clamp 72, 77, the clamp 72, 77 engages and secures the container at the bottom position of the stack 3. In the embodiment shown, the clamped container 1, 91 becomes the first container in the stack 3; thus the clamp 72, 77 defines the location 7 of the new stack.

At (iii), the lifter 71, 78 returns to its original condition, and the container 1, 91 and stack 3 are retained by the clamp 72.

At (iv), the conveyor 5 shifts the remaining containers 1 to the left until the next container 1, 92 is disposed beneath the clamp 72, 77 and stack 3, in location 7.

At (v), the lifter 71, 78 lifts the next container 1,92 until it is beneath the previously-clamped container 1, 91 is in contact with the container 1, 91, or otherwise in sufficiently close proximity that the clamp 72, 77 can release the container 1, 91 at the bottom of the stack so that it rests on top of the container 1, 92 without harm or damage. With the clamp in an unengaged position and not supporting either container 91, 92, the lifter 71, 78 lifts both containers until the bottom container 1, 92 is suitably disposed for engagement and retention by the clamp 72, 77.

At (vi), the clamp 71, 77 engages the bottom container 1, 92 and supports the weight of both containers 91, 92 and their contents, and thus the enhanced stack 3. The lifter 72, 77 returns to its original position.

At (vii), the conveyor moves the remaining unstacked containers 1 to the left and the process (i)-(vi) can be repeated until all desired containers 1 are stacked at the stack location 7.

Any or all steps of process (i)-(vi) in FIG. 7 can be applied in reverse order in order to enable retrieval of container(s) 1 from a stack 3.

For example, at (v), a lifter 71, 78 rises to engage the lowest container 1, 92 in a stack 3 comprising two containers 1, and the clamp 72, 77 moves to an unengaged position releasing the stacked containers 91, 92. With the clamp 77, 72 in an unengaged position, the lifter 71, 78 supports both containers and their contents. The lifter lowers the two stacked containers 91, 92 until the upper container 91 is at a height, or is otherwise disposed, such that it can be engaged by the clamp 72, 77.

At (iv), the clamp has engaged and retainer the upper container which now forms the bottom of the stack, and the lifter has lowered the container 1, 92 originally at the bottom of the stack 3 to a position beneath the stack where it can be moved to another location by the conveyor 5.

While the example sequences described above illustrate how a series of containers 1 can be stacked or retrieved from a single stack 3 or location 7, in other scenarios, containers can be stored or retrieved in any sequence at any number of stack locations during operation of an order processing system. For example, as shown in FIG. 7, a plurality of lifters may be provided, in order to enable storage and/or retrieval from a number of stack locations 7 along a single conveyor. In the embodiment shown, four (4) lifters 71 are provided, each in a location 7 beneath a clamp 72; thus containers 1 may be added to, removed from, and/or otherwise accessed at, at least four (4) stacks 3 in stack locations 7 at any time.

Lifters 71 can be configured to engage containers 1 on a conveyor 5, trolley (not shown) or other conveyance in any desired or otherwise suitable manner. For example, as illustrated in the example(s) shown in FIG. 7, in some embodiments, a lifter 71 can be configured to lift a container 1 by lifting the conveyor section 81 on which the container 1 is transported, and thereafter return that section 81 to the same or another place. In other embodiments, lifter(s) 71 can be configured to enable engagement of the container by a clamp through other means. For example, as shown in FIG. 5, in some embodiments, a lifter 71 can be configured to push up through an opening 83 in the conveyor 5 to engage and lift the bottom of a container 1. In other embodiments, lifter(s) 71 can include one or more mechanisms which engage the container on the conveyor from one or more sides and then lift the container to be engaged by a clamp 72. In other embodiments, the container 1 may be lifted by a mechanism from an upper surface of the conveyor.

As previously noted, one or more of clamp(s) 72 can be configured to engage, retain and support the weight of container(s) at a stack location 7. In some examples, clamp(s) 72 can be configured to engage one or more sides of a container, the bottom of a container, a lip or other protrusion, or any suitable surface or structure, or combination of surfaces or structures, of a container. For example, clamp(s) 72 illustrated in FIG. 7 are configured to engage a bottom container 1, 92 in a stack 3 by engaging the sides, or lugs, pins, or other structures attached thereto, of the container. In another example, a clamp 72 can include one or more members which are configured to extend beneath a container to engage and support a bottom surface of a container.

Clamp(s) 72 can include any suitably-configured mechanical, hydraulic, pneumatic, electrical-mechanical and/or other mechanism(s) for releasably engaging and retaining one or more containers. In some examples, clamps and/or lifters may be implemented with conventional stacking machine mechanisms which do not restrict access to the stack from overhead load handlers, and which are suitable for use within the grid or other overall structure. In preferred embodiments, both clamp(s) 72 and lifter(s) 71 are configured to support the weight of a container and any desired or otherwise anticipated contents, as well as the weight of any desired number(s) of stacked containers and their contents.

In some examples, containers 1 may be configured to improve or enable engagement with the clamps. For example, containers may be configured with lip(s), handle(s), aperture(s), or other indentation(s) or protrusion(s) suitable for engaging with clamps to support load requirements of the system. In some examples, containers may be comprise materials or surface angles or configurations which increase supportive friction between the containers and the clamps.

The containers can also be configured to improve and/or enable retaining engagement with the gripper or other mechanism(s) on the overhead load handlers. In some examples, the containers can be configured to engage a plurality of different clamps, grippers or other retaining, transport or other mechanisms in the system.

Figure 12A:
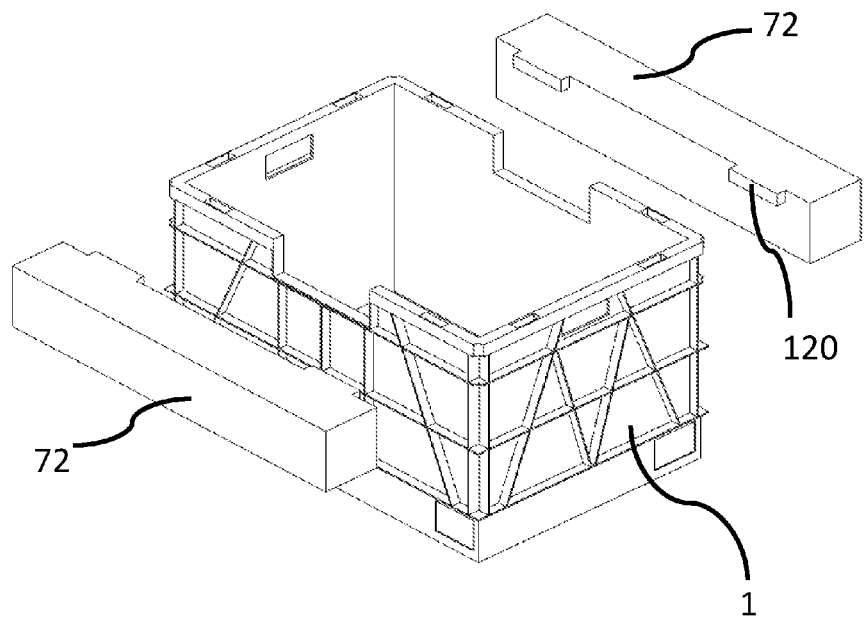
FIGS. 12a and 12b are schematic diagrams showing devices/mechanisms suitable for use in implementing aspects of the invention.
Figure 12B:
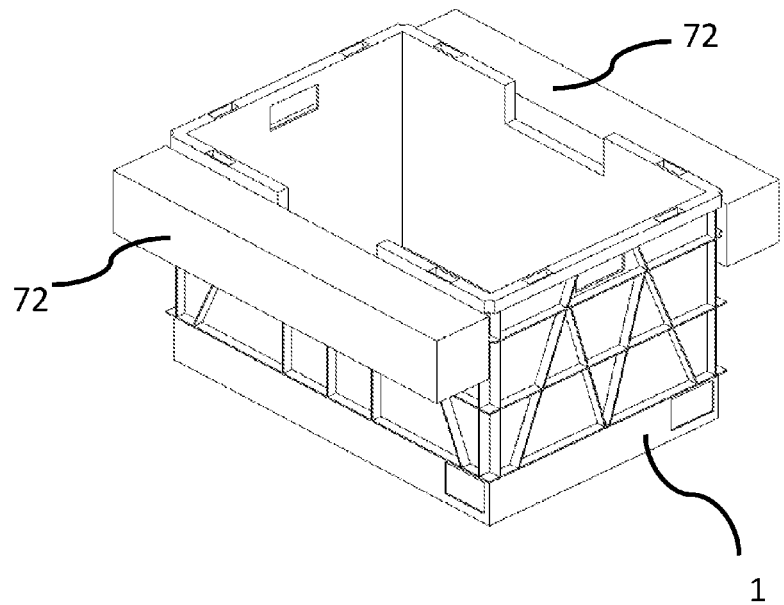

FIGS. 12a and 12b show example clamps 72 and an example container 1. FIG. 12a shows the clamps 72 in an unengaged position. The example clamps 72 include protrusions for enabling or improving engagement with the container 1. Once the clamps are positioned around a container (whether via translation of the container and/or the clamps), the clamps 71 can be configured to move towards and engage the container 1. FIG. 12b shows the clamps 72 in an engaged position. The protrusions can be configured to engage with a lip, indentation and/or aperture in the container. Via this engagement and/or with other supporting mechanisms, the protrusions or other engagement structures can be configured to support the weight of the container 1 and its contents, as well as the weight of any containers and contents above the engaged container in the stack.

In some example embodiments, the containers may include protrusions which engage with indentations, lips and/or apertures in the clamp(s).

In some examples, the clamps may include one or more locking mechanisms for further securing the container with the clamps.

As, for example, shown in FIG. 7, in various embodiments lifter(s) 71 can be fixedly or removeably positioned beneath clamp(s) 72 to define stack location(s) 7.

Figure 8A:
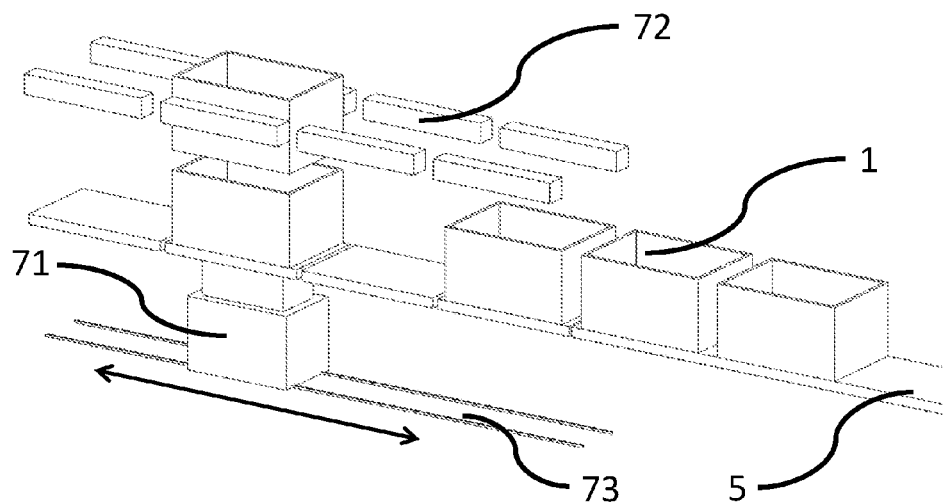
FIGS. 8a, 8b and 9 are schematic diagrams showing devices/mechanisms suitable for use in implementing aspects of the invention.

In further embodiments, lifter(s) 71 can be moveable between positions beneath different stack locations 7 via shuttle(s), rail(s), wheels, and/or other means. Thus, for example, lifter(s) 71 can be moveable between positions beneath different stack locations 7. For example, as illustrated in FIG. 8a, a lifter 71 can be configured to travel along one or more rails 73 and thereby shuttle between clamp locations. Such moveable lifters 71 can be configured to move to positions beneath any number of stack locations to lift container(s) beneath any desired clamp(s) 72. In some circumstances, moveable lifters 71 can provide efficiency by reducing or eliminating the need to have dedicated lifter(s) at desired stack location(s) 7. While not shown, lifter(s) 71 may be configured to travel multiple directions e.g. along a transverse or perpendicular grid. In some examples, lifters may include wheels or other travel mechanisms and may not be confined to travelling along track(s).

Figure 8B:
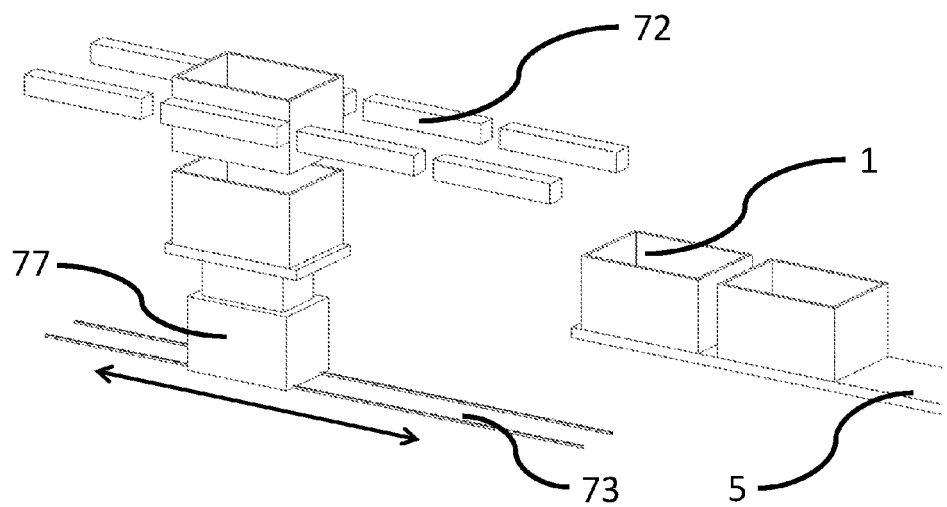

Movable lifter(s) 71 can be used in conjunction with conveyor(s) 5, as shown for example in FIG. 8a, and/or with any other suitably-configured means for moving container(s) 1. Thus, for example, in various embodiments, system(s) 40 configured for bottom-access to containers in accordance with the invention can include shuttle(s) 77 for moving lifter(s) between different stack locations 7, as shown in FIG. 8b.

In some examples, the lifters can include any mechanical, hydraulic, pneumatic, electrical-mechanical and/or other mechanism(s). The lifters and the clamps can be controlled by the same or separate programmable logic controllers (PLC) as the rest of the system.

In some embodiments, lifter(s) 71 can alternatively or additionally include one or more mechanisms for lowering one or more clamps 72 to engage container(s) 1 on a conveyor 5 or otherwise disposed beneath the stack. Once such a clamp 72 is lowered, the clamp can engage and retain the container(s), and be returned to a stack storage position. Such embodiments are, for example, consistent with the embodiment(s) of moveable clamps 79 shown in FIG. 9, but can also be applied to any of the embodiments described, illustrated or suggested herein.

With reference to FIG. 9, a system 40 for stacking containers in accordance with the invention can include one or more moveable clamps 79, configured to move one or more container(s) 1 rapidly and efficiently between the top and bottom of a grid 2, so that, for example, it may be handed off from an overhead handler 4 at or near the top of the grid, to a conveyor 5, lifter 71, or other device at or near the bottom of the grid, or vice-versa. Such system(s) can include one or more mechanisms, such as a bin elevator 75, for moving the moveable clamp(s) along the height of the stack 3 or grid 2.

By retaining one or more containers 1 near the top of the stack location 7, the time required to place the containers in, or remove them from, a stack 3 can, in some examples, be reduced by reducing the distance the hoist 8 has to lower the gripper 6 to retrieve a container from the top of the stack. Such time savings can be maximized by, for example, configuring the moveable clamp 79 to lift a container to the hand-over position 74 before the overhead load handler 4 arrives at the stack location.

Similarly, efficiency may be realized when an overhead load handler 4 hands off a container to a moveable clamp 79 at the hand-over position 74. While the moveable clamp 79 lowers the container to the top of the stack, the overhead load handler can move on to another task. In some examples, this may reduce or eliminate the time required for an overhead load handler to lower a container all the way down to the top of the stack and then retract the hoist.

While the example in FIG. 9 illustrates a single container 1 being lifted by the moveable clamp 79, the moveable clamp can be configured to retain or lift any number of containers. In the embodiment shown in FIG. 9, bin elevator system 42 in FIG. 9 includes optional clamp 72 and lifter 71 mechanisms. In other examples, the bin elevator system 42 may not have the lower clamp 72 and the moveable clamp 79 can be used to engage the bottom container of the stack.

In an operational example, a stack with a moveable clamp 79 can be utilized at or when depositing a container at a picking station(s) or somewhere in the grid. For example, one or more robotic load handlers 4 can be configured to deposit containers at the hand-over position 74 with a small latency because the high hand-over position can only require a short winch distance. While the moveable clamp 79 transports the container to the top of the stack 7, releases it and returns to the hand-over position, the robotic load handler can move on to another task and can make room for another load handler arriving with another container.

Concurrently, subsequently or otherwise independent of the load handler and moveable clamp activities, the clamp 72 and lifter 71 at the bottom of the stack 7 can be operated to remove containers from the bottom of the stack such as for delivery to a picker or for moving a container to a different location. This process may be independent from the movements/activities of the robotic load handlers, and may be only on occasion dependent on the movement of the moveable clamp 79.

In some examples, several such bin elevator systems 42 can be configured to serve one picker. There can also be one or more bin elevator systems 42 to return the containers after picking. In this case, all the components of the bin elevator system 42 operate in reverse from the example described above. In some examples, this can lead to a total productivity gain for the picker of 25-35%, compared to a system without the bin elevators 42. Concurrently, in some example, the productivity of the robotic load handlers can increase by 7-12%.

In various embodiments, bin elevator system (s) 42 can include moveable and/or intermediate clamp(s) 79, 72 for retaining a portion of the stack as unretained containers are removed or adding to the top or the bottom of the stack.

Figure 10:
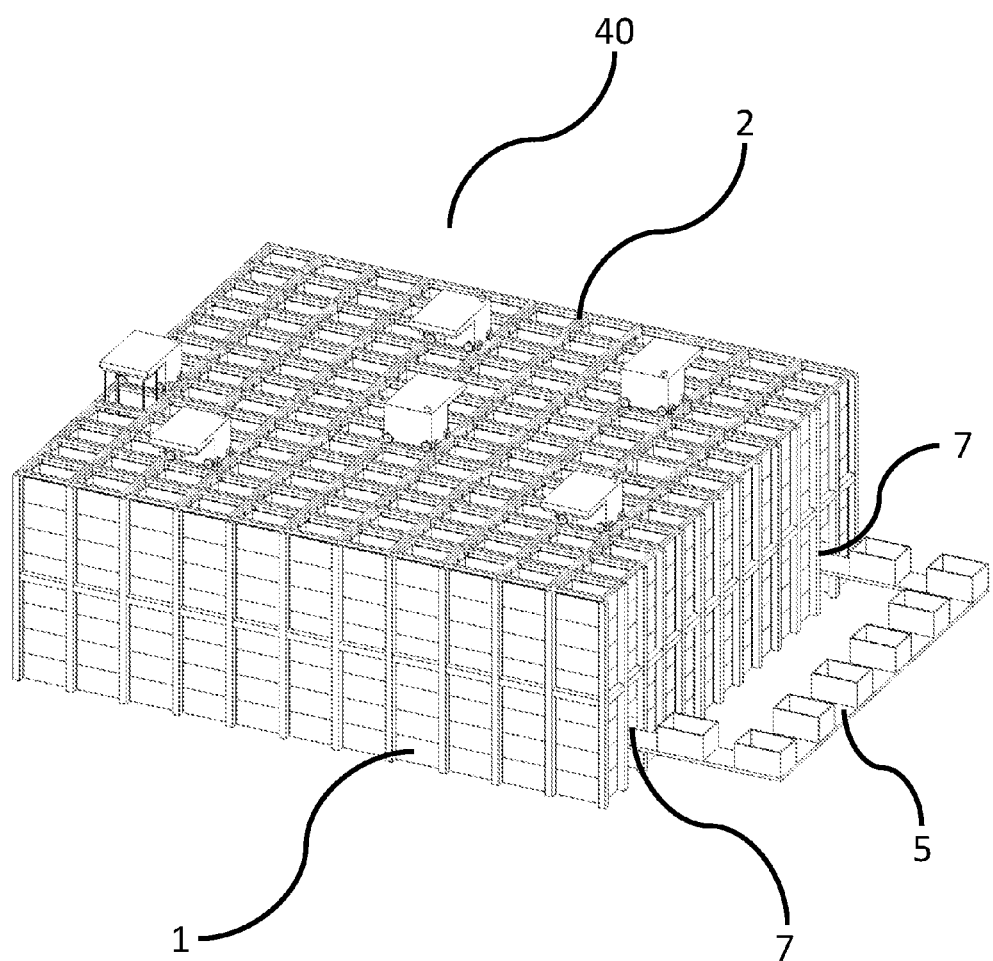
FIGS. 10, 11 and 11a are schematic diagrams showing aspects of an embodiment of a storage and retrieval system including devices suitable for use in implementing aspects of the invention.

In another example, storage and retrieval systems 40 in accordance with the invention can be implemented with multiple stations, or locations, 7 adapted for storing, retrieving, and/or otherwise accessing containers 1 from the bottom of stack(s) 3 within a grid 2. An example embodiment of such a system 40 is shown in FIG. 10. In the embodiment shown in FIG. 10, storage and retrieval system 40 includes a conveyor 5 which can be used to move containers 1 between two parts of the grid 2. Embodiments such as that shown in FIG. 10, comprising external connection(s) between ports or stack locations 7, can be used to move container(s) 1 quickly between portions of a grid 2 to relieve, for example traffic congestion among load handlers 4, lifters 71/clamps 72, etc., or otherwise optimize or improve the efficiency of container storage within the grid. In such embodiments, one or more stacks 3 can be used as buffers to temporarily store containers at one or near or both ends of the connection. In some examples of this embodiment, the reduced congestion can increase the overall capacity of the whole system by 3-5%.

In one example embodiment, as shown in FIG. 5, the system can include one or more stacker systems 70 connected to a conveyor 5. While the example stacker systems 70 in FIG. 5 are illustrated at a side of the grid 2, these stacker systems 70 can be located anywhere in or proximate to the grid, or otherwise accessible by load handlers configured for accessing the grid.

In one operational example, container(s) 1 are transported to the grid 2 via one or more conveyors 5 and are inducted into the grid 2 via one or more stacker systems 70. As illustrated in FIG. 5, the clamps and lifters can be configured to load incoming containers 1 into the bottom of one or more designated stacks (By way of example, two designated stacks are illustrated in FIG. 5). In some examples, without the burden of considering a final storage location for each incoming container, the containers can be rapidly added to the bottom of the designated stack(s). Independent from the timing of the containers being inducted to the bottom of the designated stacks, overhead load handler(s) 4 can retrieve container(s) 1 from the top of the designated stacks and move them to be stored elsewhere in the grid 2 or to be retrieved for dispatch to a picking station, restocking station or elsewhere.

This embodiment can, in some examples, improve efficiency when containers from the restocking station 30 are inducted into the storage and retrieval system 40 or when a large number of containers are returning from the order picking system 50 to the storage and retrieval system 40. For example, the (re)stocking of goods can involve transferring goods from pallets into containers. Depending on the nature of the product and its wrapping, this process can require vastly different amount of time per container. For some product, the container filling rate can vastly exceed the rate at which the load handlers 4 could put the containers away in the storage system 40. For other products, the container filling rate can be very low. By the introduction of a buffer in between the manual process and the automated load handler process, both can operate independently at potentially high productivity. In addition, the presence of more than one stacker system 70, also spreads the traffic, so that several load handlers 4 can retrieve containers concurrently. In some examples overall labour productivity gain of this embodiment can be 30-40%.

In another example embodiment, the process can be used in reverse, in order to get a large number of containers 4 onto a conveyor 5 without restrictive congestion at the drop-off point.

Figure 6:
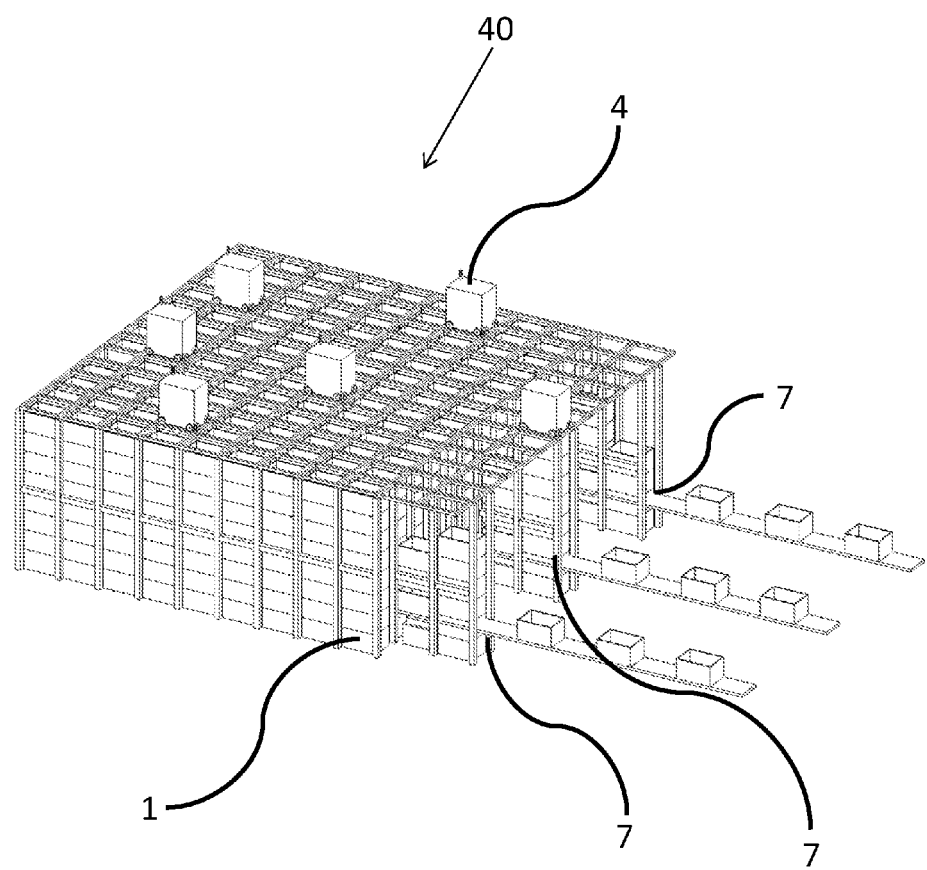

FIG. 6 shows an example system having a plurality of buffering stack locations 7 as described herein for inducting and/or retrieving containers into and/or out of the storage and retrieval system 40. In some examples, each buffering stack locations may be used as an induction or a dispatch location. In some examples, one or more buffering stack locations may be configured as dedicated induction or dispatch locations. In some examples, one or more buffering stack locations may vary between acting as induction locations or dispatch locations depending on the load conditions in the system.

In some examples, by providing one or more buffering stack locations 7, containers can be transported into or out of the storage-and-retrieval system 40 more efficiently by allowing overhead load handlers 4 and clamp/lifter handlers to operate at their own pace based on system loads and demands. In some examples, this may reduce or eliminate backlogs of load handlers 4 waiting to drop off/pick up containers from port locations 7, and backlogs of containers (coming from or going to picking stations/restocking stations) waiting to be inducted/dispatched into/from the storage-and-retrieval system.

During induction, the load handler(s) 4 can be configured to retrieve container(s) from the top of the buffering stack locations and transport them for storage elsewhere in the storage-and-retrieval system. Conversely, during retrieval/dispatch, the load handler(s) 4 can be configured to retrieve a desired container from elsewhere in the storage-and-retrieval system, and transport top the top of the buffering stack location.

In some embodiments, one or more processor(s), controller(s), and/or other control system devices (which may be collectively referred to generically as processor(s) throughout this disclosure) can be configured to coordinate or otherwise control the timing of the operations of the conveyor(s), clamp(s), lifter(s) and load handler(s). This coordination can, in some examples, include ensuring that the timing of clamp(s), lifter(s) and/or conveyor(s) operations are coordinated such that a lifter begins lifting after a conveyor moves a container into a position where it can be engaged by the lifter, and such that a clamp begins movement to engage a container after a lifter has operated to move the container into a position where it can be engaged by the clamp. This can be similarly applied in the reverse order.

In some embodiments, the processor(s) can be configured to coordinate and control the operation of the overhead load handler(s) in conjunction with the lifter(s) and clamp(s) below. While the overhead load handler(s) can be configured to operate independently and asynchronously with the lifter(s) and clamp(s), these device(s) can be coordinated and/or controlled such that the timing and movement of the hoist and gripper of an overhead load handler compensates for the potentially changing height of the top of the stack based on stacking activities by the lifter(s) and clamp(s). Conversely, the clamp(s) and lifter(s) can be controlled or instructed such that any additions or removal of containers from the bottom of the stack do not interfere with an overhead load handler's addition or removal of a container from the top of the stack.

In some embodiments, the processor(s) can be configured to coordinate and control the operation of conveyor(s), lifter(s), clamp(s) and overhead load handler(s) to balance the movement of containers between a plurality of ports/buffers/stack locations 7 (see for example, FIG. 6). In some examples, this can balance work loads between different device(s), and/or can reduce load handler or container congestion in any one area of the system.

Figure 11:
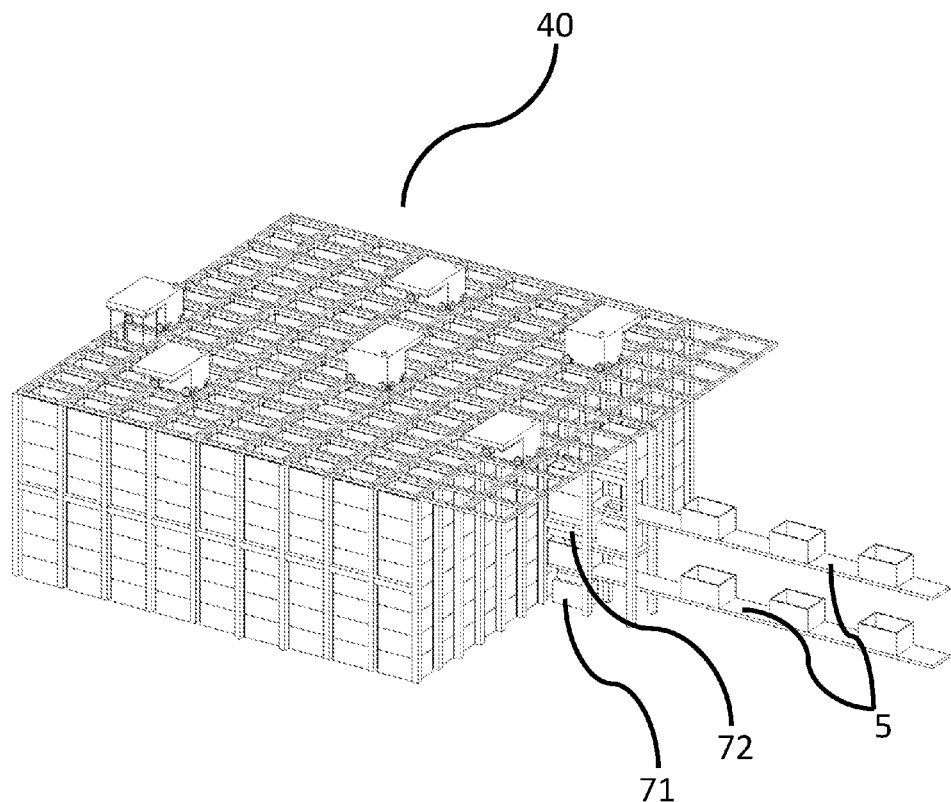
Figure 11A:
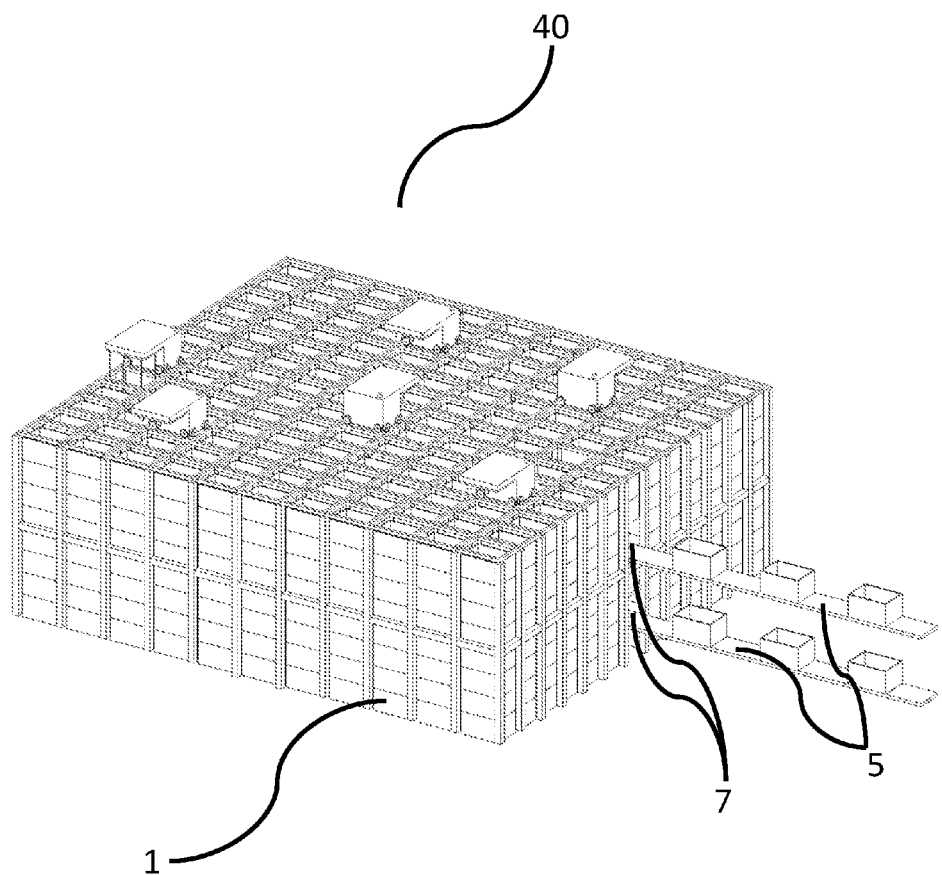

Further example(s) of storage and retrieval system(s) 40 comprising multiple ports or stack locations 7 are shown in FIG. 11. In the embodiment shown in FIG. 11, a system 40 includes multiple conveyors 5 extending into what can be a single row of stacks 3 of the grid 2 at different levels, one above the other. As shown in the embodiment of FIG. 11, clamp(s) 72, lifter(s) 71, and stack location(s) can 7 be staggered vertically. In examples such as that shown in FIG. 11, conveyors 5 at multiple levels can bring containers to and from multiple stacks 2 wherein a first stack is positioned directly above a second stack. In some examples of this embodiment, the reduced congestion can increase the overall capacity of the whole system by another 2-4%. FIG. 11a shows another example configuration which may operate similar to to the system in FIG. 11.

Similar to any of the example embodiments described herein, rather than approaching from the bottom, conveyor(s) or other transport mechanisms can be configured to transport incoming containers to overhead load handlers for storing the containers into one or more designated stacks from above without regard to any final storage destination for the container. Containers can then be removed from the bottom of the designated stacks by the clamp/lifter mechanisms for storage elsewhere in the grid or dispatch.

The provision of conveyors and other mechanisms for storing and retrieving containers at different levels of a grid 2 can enable access to the grid from one or more sides thereof. Such access can be provided as an alternative or in addition to access from above and/or below the grid. In various examples, additional or alternative directions from which to access the grid can be used reduce contention or congestion, or otherwise improve access times or efficiency of the system.

As will be further understood by those skilled in the relevant arts, significant advantage may be realized through the full or partial automation of any of the processes 200 described above, or portions thereof. Such automation may be implemented by, for example, providing automated controllers for lifters 71, clamps 72, shuttles 77, load handlers 4, conveyors, bin elevators 75 and/or other components of systems 30, 40, 50, etc. Such automation may be provided in any suitable manner, including for example the use of automatic data processors executing suitably-configured, coded, machine-readable instructions using a wide variety of devices, some of which are known and others of which will doubtless be developed hereafter. Processor(s) suitable for use in such implementations can comprise any one or more data processor(s), computer(s), and/or other system(s) or device(s), and necessary or desirable input/output, communications, control, operating system, and other devices, including software, that are suitable for accomplishing the purposes described herein. For example, a general-purpose data processor provided on one or more circuit boards will suffice.

The systems described herein can be controlled at least in part by one or more control systems. Control system(s) can include one or more processor(s), memory device(s), and communication system(s)/device(s) for controlling any number of robots, conveyors, load handlers, picking devices, clamps, lifters and/or other mechanisms or devices at one or more aspects of one or more order processing system(s) 250. For example, the processor(s) can be configured to communicate with and/or control/instruct load handlers, conveyors, lifts, clamps and/or any other devices for transporting, storing and/or retrieving bins, pallets, items etc. to and from pallet storage 70, pick station(s) 30, 100, 50, storage and retrieval system(s) 40, 100, order picking system(s) 100, 50, vehicle loading 60, and/or any other aspects of the system. The control system(s) 1030 can, in some examples, include wired and/or wireless communication networks for communicating with the various devices. These control system(s) may be centralized or distributed across any number of physical and/or logical locations, devices, and/or systems. For example, the example system(s) and/or method(s) described herein may be performed by a single control system or device, or may be performed across multiple systems and/or devices. References to processor(s), device(s) and/or system(s) may applied or implemented by any processor, device and/or system within any device and/or system in the system as a whole irrespective of its physical or logical location.

While the disclosure has been provided and illustrated in connection with specific, presently-preferred embodiments, many variations and modifications may be made without departing from the spirit and scope of the invention(s) disclosed herein. The disclosure and invention(s) are therefore not to be limited to the exact components or details of methodology or construction set forth above. Except to the extent necessary or inherent in the processes themselves, no particular order to steps or stages of methods or processes described in this disclosure, including the Figures, is intended or implied. In many cases the order of process steps may be varied without changing the purpose, effect, or import of the methods described. The scope of the invention is to be defined solely by the appended claims, giving due consideration to the doctrine of equivalents and related doctrines.

What is claimed is:

1. A system for stacking containers in an automated storage and retrieval system, comprising:
    two substantially perpendicular sets of rails forming a grid and having at least one robotic load handling device operable thereon, the load handling device including a body mounted on two sets of wheels, the first set of wheels being arranged to engage with at least two rails of the first set of rails, the second set of wheels being arranged to engage with at least two rails of the second set of rails, the first set of wheels being independently moveable and driveable with respect to the second set of wheels such that only one set of wheels is engaged with the grid at any one time thereby enabling movement of the service device along the rails to any point on the grid by driving only the set of wheels engaged with the rails;
    one or more clamps, each clamp defining a stack location and configured for clamping to a lowest container in a stack, the one or more clamps configured to support a weight of a plurality of containers in the stack; and
    a lifter configured for enabling engagement by one of the clamps to a container which is disposed beneath the stack, wherein engagement and disengagement of the clamps enables containers to be added to or removed from a bottom of the stack,
    the at least one overhead load handler configured for lifting one or more containers from a top of the stack, and for lowering one or more containers onto the top of the stack.

2. The system for stacking containers of claim 1, wherein the lifter is configured to be positioned beneath one or more of the stack locations.

3. The system for stacking containers of claim 1, wherein the lifter is configured to lift or support a stack of containers at a stack location when the clamp is in an unengaged condition.

4. The system for stacking containers of claim 1, wherein the lifter is configured to engage a bottom or a side of the container.

5. The system for stacking containers of claim 1, wherein the lifter comprises: one or more mechanisms for lowering a clamp to engage a container disposed beneath the stack and for lifting the clamp and an engaged container to form the bottom of the stack.

6. The system for stacking containers of claim 1, comprising: a conveyor for conveying a container to or from a position beneath a stack location where it can be lifted by the lifter.

7. The system for stacking containers of claim 1, wherein the lifter is configured for lifting two or more incoming stacked containers from beneath one of the stack locations, a bottom container of the incoming stacked containers to be clamped to form the bottom of the stack.

8. The system for stacking containers of claim 1, comprising: a shuttle for moving the lifter to be positioned beneath different stack locations.

9. The system for stacking containers of claim 8, wherein the lifter is configured to support one or more containers as the lifter is moved between different stack locations.

10. The system of claim 1, comprising: at least one processor configured to manage movement of containers in the system wherein managing the movement of the containers in the system includes generating signals for controlling or instructing the one or more clamps, the lifter, and the at least one overhead load handler.

11. The system of claim 10, wherein managing the movement of containers in the system comprises:
the processor being configured for generating signals for storing at least one of the containers in the system in a position in the stack designated to be part of a buffer region.

12. The system for stacking containers of claim 1, comprising: a second clamp at a stack location, the second clamp being moveable along a height of the stack and configured to clamp and lift any container in the stack.

13. The system for stacking containers of claim 12, wherein the second clamp is configured to support one or more containers as containers are removed or added to the top of the stack.

14. The system for stacking containers of claim 12, wherein the second clamp is configured to support one or more containers as containers are removed or added to the bottom of the stack.

15. The system for stacking containers of claim 1, wherein one or more of the clamps define freestanding stack locations or frame supported stack locations.

16. The system of claim 15 wherein the at least one processor is configured to:
generate signals for controlling or instructing the one or more clamps and the lifter to add containers to the bottom of the stack; and
generate signals for independently controlling or instructing the at least one overhead load handler to lift containers from the top of the stack.

17. The system of claim 15 wherein the at least one processor is configured to:
generate signals for controlling or instructing the at least one overhead load handler to lower containers onto the top of the stack; and
generate signals for independently controlling or instructing the one or more clamps and the lifter to remove containers from the bottom of the stack.

18. The system of claim 15 wherein the at least one processor is configured to:
generate signals for controlling or instructing the one or more clamps and the lifter to transfer a container from the bottom of the stack to a conveyor;
generate signals to cause the container to be transported below a second stack location; and
generate signals for controlling or instructing a second clamp and a second lifter to add the container to the bottom of the second stack.

19. The system of claim 15 wherein the generation of the signals for controlling or instructing the one or more clamps, the lifter, and the at least one overhead load handler are timed or include delays to avoid interference as containers are added or removed from the top or bottom of the stack.

20. A method for operating an automated storage and retrieval system including two substantially perpendicular sets of rails forming a grid and having at least one overhead load handler operable thereon, the at least one overhead load handler including a body mounted on two sets of wheels, the first set of wheels being arranged to engage with at least two rails of the first set of rails, the second set of wheels being arranged to engage with at least two rails of the second set of rails, the first set of wheels being independently moveable and driveable with respect to the second set of wheels such that only one set of wheels is engaged with the grid at any one time thereby enabling movement of the service device alonq the rails to any point on the grid by drivinq only the set of wheels engaged with the rails, the method comprising:
generating, by at least one controller, signals for coordinating operation of a lifter and at least one clamp to add incoming containers to a bottom of a stack in the grid, the at least one clamp configured for clamping a lowest container in the stack; and
generating, by the at least one controller, signals for controlling or instructing the at least one overhead load handler to lift one or more containers from a top of the stack.

* * * * *